United States Patent
Gernoth et al.

(10) Patent No.: US 10,650,540 B2
(45) Date of Patent: *May 12, 2020

(54) DETERMINING SPARSE VERSUS DENSE PATTERN ILLUMINATION

(71) Applicant: Apple Inc., Cupertino, CA (US)

(72) Inventors: Thorsten Gernoth, San Francisco, CA (US); Ian R. Fasel, San Francisco, CA (US); Haitao Guo, Cupertino, CA (US); Atulit Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,854

(22) Filed: Jul. 17, 2019

(65) Prior Publication Data

US 2019/0347813 A1 Nov. 14, 2019

Related U.S. Application Data

(63) Continuation of application No. 15/912,917, filed on Mar. 6, 2018, now Pat. No. 10,401,158.

(Continued)

(51) Int. Cl.
*G06T 7/514* (2017.01)
*G01B 11/14* (2006.01)
(Continued)

(52) U.S. Cl.
CPC .............. *G06T 7/514* (2017.01); *G01B 11/14* (2013.01); *G01B 11/2513* (2013.01);
(Continued)

(58) Field of Classification Search
CPC . G06T 7/514; G06T 7/74; G06T 2207/30244; G06T 2207/10048;
(Continued)

(56) References Cited

U.S. PATENT DOCUMENTS

| | | | |
|---|---|---|---|
| 7,206,435 B2* | 4/2007 | Fujimura | A61B 3/113 |
| | | | 382/117 |
| 7,237,919 B2 | 7/2007 | Uomori et al. | |

(Continued)

FOREIGN PATENT DOCUMENTS

| | | |
|---|---|---|
| CN | 1531304 A | 9/2004 |
| CN | 102625047 B | 10/2008 |

(Continued)

OTHER PUBLICATIONS

U.S. Appl. No. 15/910,551, Gernoth et al., filed Mar. 2, 2018.
(Continued)

*Primary Examiner* — Xuemei G Chen
(74) *Attorney, Agent, or Firm* — Kowert, Hood, Munyon, Rankin & Goetzel, P.C.; Gareth M. Sampson

(57) ABSTRACT

An estimate of distance between a user and a camera on a device is used to determine an illumination pattern density used for speckle pattern illumination of the user in subsequent images. The distance may be estimated using an image captured when the user is illuminated with flood infrared illumination. Either a sparse speckle (dot) pattern illumination pattern or a dense speckle pattern illumination pattern is used depending on the distance between the user's face and the camera.

20 Claims, 11 Drawing Sheets

Related U.S. Application Data

(60) Provisional application No. 62/539,741, filed on Aug. 1, 2017, provisional application No. 62/556,400, filed on Sep. 9, 2017, provisional application No. 62/556,832, filed on Sep. 11, 2017.

(51) Int. Cl.
  *G06T 7/73*   (2017.01)
  *G06K 9/20*   (2006.01)
  *H04N 5/225*  (2006.01)
  *H04N 5/33*   (2006.01)
  *G01B 11/25*  (2006.01)
  *G06K 9/00*   (2006.01)

(52) U.S. Cl.
  CPC ....... *G06K 9/00221* (2013.01); *G06K 9/2027* (2013.01); *G06K 9/2036* (2013.01); *G06T 7/74* (2017.01); *H04N 5/2251* (2013.01); *H04N 5/2256* (2013.01); *H04N 5/33* (2013.01); *G06T 2207/10048* (2013.01); *G06T 2207/30244* (2013.01)

(58) Field of Classification Search
  CPC ............... G06K 9/2027; G06K 9/2036; G06K 9/00221; G06K 2009/00328; G06K 9/00288; G06K 9/00255; H04N 5/2251; H04N 5/2256; H04N 5/33; G01B 11/14; G01B 11/2513
  See application file for complete search history.

(56) References Cited

U.S. PATENT DOCUMENTS

| | | | |
|---|---|---|---|
| 7,469,060 B2 | 12/2008 | Bazakos et al. | |
| 7,748,629 B2 * | 7/2010 | Brock | G06K 7/10801 235/462.11 |
| 7,922,353 B2 * | 4/2011 | Isely | F21S 9/02 362/228 |
| 8,150,142 B2 | 4/2012 | Freedman et al. | |
| 8,263,921 B2 * | 9/2012 | Lang | G06F 3/0317 250/206.2 |
| 8,384,997 B2 | 2/2013 | Shpunt et al. | |
| 8,675,921 B2 * | 3/2014 | Yang | G01B 11/002 382/106 |
| 8,749,796 B2 | 6/2014 | Pesach et al. | |
| 8,761,495 B2 * | 6/2014 | Freedman | G06T 7/521 382/154 |
| 8,913,839 B2 | 12/2014 | Ricanek, Jr. et al. | |
| 8,982,182 B2 * | 3/2015 | Shpunt | G06F 3/005 348/42 |
| 9,081,430 B2 * | 7/2015 | Yamashita | G06F 3/0304 |
| 9,098,931 B2 * | 8/2015 | Shpunt | G01B 11/2518 |
| 9,165,367 B2 * | 10/2015 | Kim | G06T 7/529 |
| 9,195,883 B2 * | 11/2015 | Brewer | G06K 9/00302 |
| 9,208,566 B2 * | 12/2015 | Chen | G06K 9/00208 |
| 9,325,973 B1 * | 4/2016 | Hazeghi | G01B 11/2513 |
| 9,704,050 B2 * | 7/2017 | Lee | G06K 9/00577 |
| 9,709,387 B2 * | 7/2017 | Fujita | G01B 11/2513 |
| 9,721,150 B2 | 8/2017 | Gottemukkula et al. | |
| 9,836,643 B2 | 12/2017 | Saripalle et al. | |
| 9,881,375 B2 * | 1/2018 | Gordon | G06T 7/80 |
| 10,019,657 B2 * | 7/2018 | Lin | G06K 9/66 |
| 10,054,430 B2 * | 8/2018 | Mor | G02B 27/1093 |
| 10,068,347 B2 * | 9/2018 | Lee | G06T 7/593 |
| 10,198,671 B1 * | 2/2019 | Yang | G06T 11/60 |
| 2004/0047058 A1 * | 3/2004 | Unno | B60R 11/04 359/883 |
| 2009/0185723 A1 | 7/2009 | Kurtz et al. | |
| 2011/0316813 A1 * | 12/2011 | Gu | G06F 3/0416 345/175 |
| 2013/0010292 A1 * | 1/2013 | Umeda | G01S 17/48 356/247 |
| 2013/0329075 A1 * | 12/2013 | Liang | H04N 5/2256 348/222.1 |
| 2015/0154035 A1 * | 6/2015 | Zepeniuk | G06F 3/038 715/762 |
| 2015/0186039 A1 * | 7/2015 | Ide | G06F 3/0425 345/168 |
| 2015/0245004 A1 * | 8/2015 | Guo | H04N 5/46 348/453 |
| 2016/0026253 A1 | 1/2016 | Bradski et al. | |
| 2016/0086017 A1 * | 3/2016 | Rodriguez | G06K 9/00288 382/118 |
| 2016/0148049 A1 * | 5/2016 | Yu | H04N 5/232 348/78 |
| 2016/0178915 A1 | 6/2016 | Mor et al. | |
| 2016/0371546 A1 * | 12/2016 | Yadav | H04N 5/7605 |
| 2016/0377417 A1 | 12/2016 | Jovanovski et al. | |
| 2017/0007120 A1 | 1/2017 | Shudo | |
| 2017/0027651 A1 * | 2/2017 | Esterberg | A61B 34/10 |
| 2017/0032182 A1 * | 2/2017 | Motukuri | F25D 27/005 |
| 2017/0070680 A1 * | 3/2017 | Kobayashi | H04N 5/23293 |
| 2017/0142312 A1 * | 5/2017 | Dal Mutto | H04N 5/332 |
| 2017/0364142 A1 * | 12/2017 | Wang | G06F 3/011 |
| 2018/0025249 A1 * | 1/2018 | Liu | G06T 7/11 382/158 |
| 2018/0048880 A1 * | 2/2018 | Trail | H04N 5/2256 |
| 2018/0063390 A1 * | 3/2018 | Trail | H04N 5/2256 |
| 2018/0196998 A1 * | 7/2018 | Price | G06K 9/00288 |
| 2018/0321384 A1 * | 11/2018 | Lindner | G01S 17/89 |
| 2019/0041197 A1 | 2/2019 | Gernoth et al. | |

FOREIGN PATENT DOCUMENTS

| | | |
|---|---|---|
| CN | 104092956 A | 10/2014 |
| CN | 105704395 A | 4/2016 |
| CN | 105794196 A | 7/2016 |
| EP | 1416427 A2 | 5/2004 |
| EP | 3168777 A1 | 5/2017 |
| WO | 2012030357 A1 | 3/2012 |
| WO | 2012036692 A1 | 3/2012 |
| WO | 2017015390 A1 | 1/2017 |

OTHER PUBLICATIONS

ISR&WO, PCT/US2018/015511, dated Apr. 26, 2018, 10 pages.
ISR/WO, PCT/US2018/015594, dated Jun. 19, 2018, 14 pages.
Seung Min Choi et al., "Dense 3D depth map with DOE pattern," Ubiquitous Robots and Ambient Intelligence (URAI), 2012 9th International Conference on, IEEE, Nov. 26, 2012, pp. 34037.
Ming-Yuan Shieh et al., "Fast Facial Detection by Depth Map Analysis," Mathematical Problems in Engineering, vol. 2013, Nov. 1, 2013, pp. 1-10.
Du Pei-Qin et al., "Design and verification of diffractive optical elements for speckle generation of 3-D range senors," Optical Review, Springer Verlag, Tokyo, JP vol. 23, No. 6, pp. 1017-1025.
Anurag Chowdhury: "RGB-D Face Recognition in Surveillance Videos," Jun. 23, 2016, 70 pages.
Everingham, M. et al., "Taking the bite out of automated naming of characters in TV video," Image and Vision Computing 27 (2009) 545-559, 16 pages.
Mei Wang et al., "Deep Face Recognition: Survey," School of Information ans Communication Engineering, Beijing University of Posts and Telecommunications, Beijing, China, Apr. 24, 2018, 18 pages.
Xi Peng et al., "Reconstruction for Feature Disentanglement in Pose-invariant Face Recognition," Feb. 10, 2017, Department of Computer Science, Rutgers University, NJ, USA, 10 pages.
Chinese Patent Office,UMPER, Chinese Patent for Utility Model No. ZL201820136191.8, mailed May 9, 2019, 6 pages.
IPRP, PCT/US2018/015511, dated Feb. 13, 2020, 8 pages.

* cited by examiner

DETERMINING SPARSE VERSUS DENSE PATTERN ILLUMINATION

PRIORITY CLAIM

This patent is a continuation of U.S. patent application Ser. No. 15/912,917 to Gernoth et al., entitled "DETERMINING SPARSE VERSUS DENSE PATTERN ILLUMINATION", filed Mar. 6, 2018, which claims priority to U.S. Provisional Patent Application No. 62/539,741 to Fasel et al., entitled "DETERMINING SPARSE VERSUS DENSE PATTERN ILLUMINATION", filed Aug. 1, 2017; to U.S. Provisional Patent Application No. 62/556,400 to Fasel et al., entitled "DETERMINING SPARSE VERSUS DENSE PATTERN ILLUMINATION", filed Sep. 9, 2017; and to U.S. Provisional Patent Application No. 62/556,832 to Fasel et al., entitled "DETERMINING SPARSE VERSUS DENSE PATTERN ILLUMINATION", filed Sep. 11, 2017, each of which are incorporated by reference in their entirety.

BACKGROUND

1. Technical Field

Embodiments described herein relate to methods and systems for illuminating a subject in an image captured by a camera on a device. More particularly, embodiments described herein relate to determining a type of illumination based on a distance of a subject from the camera.

2. Description of Related Art

Facial recognition processes may be used to authenticate users for computer devices having a camera. Face detection may be used in a facial recognition process to identify faces to be used for the facial recognition process. In some cases, speckle pattern illumination is used in face detection and/or facial recognition processes to capture 3D map or "depth map" images. Examples of depth map imaging is described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein. Traditionally a system would capture, sequential images of a scene using both the sparse speckle pattern illumination and the dense speckle pattern illumination and then both of the captured images are analyzed to determine which illumination pattern is more suitable for the current subject of the images. Capturing and analyzing both images before a decision is made on which speckle pattern illumination to use for determining depth in a scene may be time consuming and power consuming, especially for mobile devices.

SUMMARY

A distance between the user's face and the user's mobile device may be used to determine an illumination type to be used for capturing an image. Distance between the user's face and the mobile device may be estimated using a camera included in the mobile device or another sensor. Either the sparse pattern or the dense pattern may be selected for use with the user's face depending on the estimated distance between the user's face and the camera. If the user's face is less than a threshold distance from the camera, the sparse pattern may be used to prevent overlapping between specks (e.g., dots) on the user's face in the illumination pattern. If the user's face is further away (e.g., greater than the threshold distance from the camera), then the dense pattern may be used to provide increase resolution in the image.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
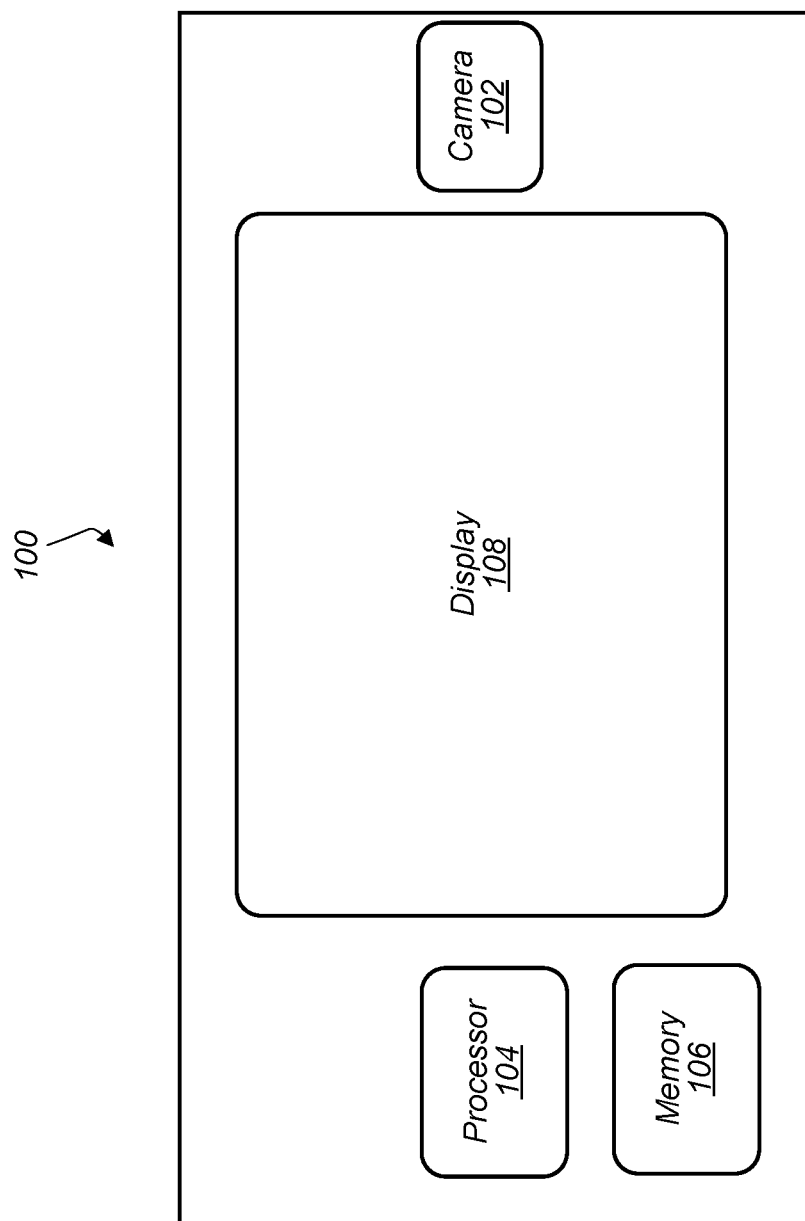
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
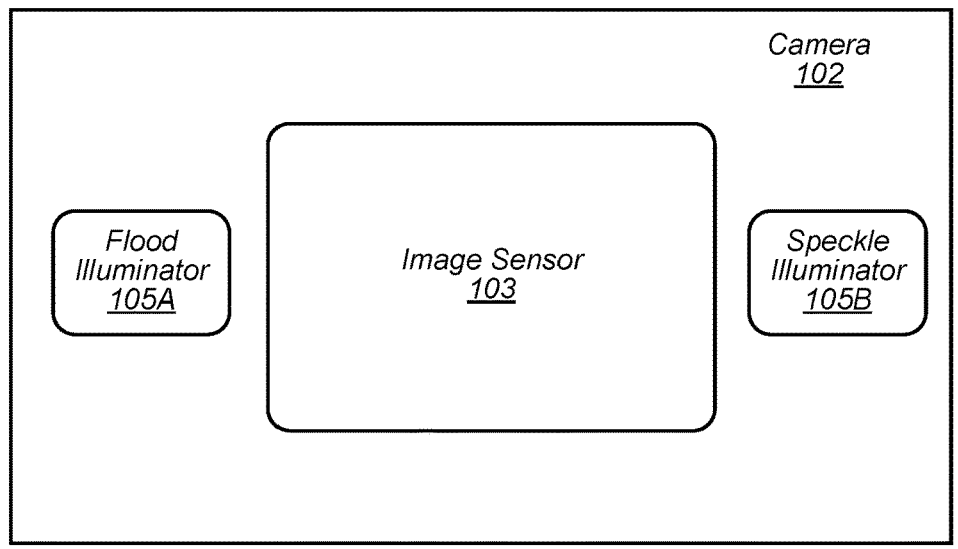
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator) and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor used to capture infrared images used for face detection and/or depth detection. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

Figure 3:
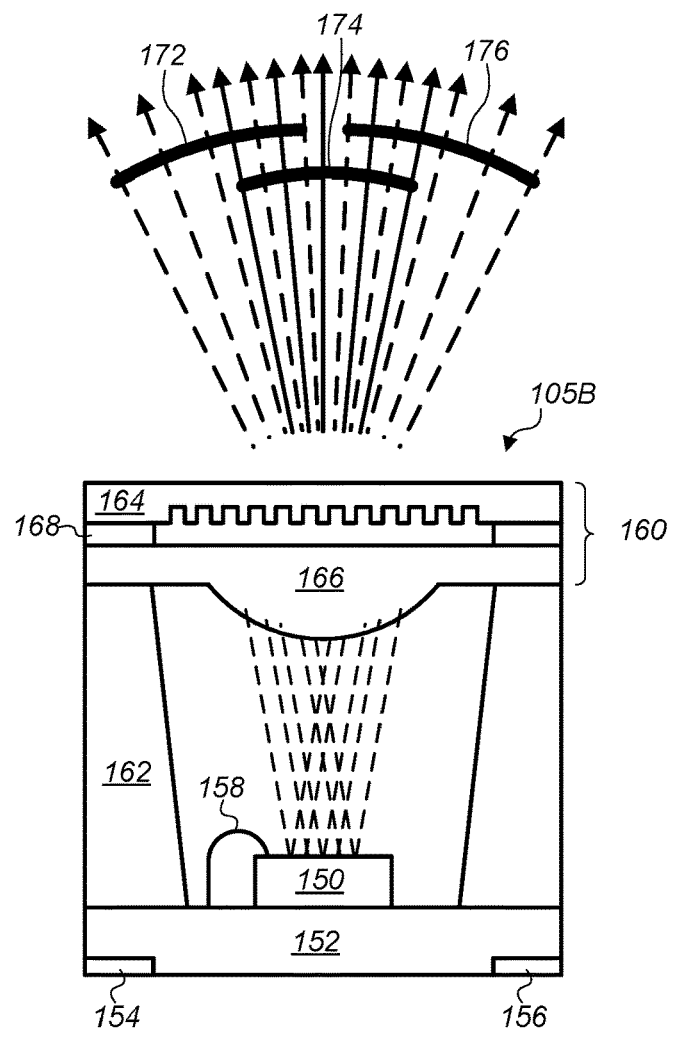
FIG. 3 depicts a schematic diagram of an embodiment of an illuminator.

Speckle pattern illuminator 105B may provide IR illumination with a speckle pattern to generate a depth map of a scene. FIG. 3 depicts a schematic diagram of an embodiment of illuminator 105B. Illuminator 105B may be similar to, for example, an integrated optical projector as described in U.S. Patent Application Publication No. 2016/0178915 to Mor et al., which is incorporated by reference as if fully set forth herein. Illuminator 105B may produce and project the speckle pattern. The speckle pattern may be a pattern of light spots (e.g., pattern of dots) with a known, and controllable, configuration and pattern projected onto a subject. In some embodiments, illuminator 105B is a light source and patterned transparency and/or a light source and an array of microlenses configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject).

As shown in FIG. 3, illuminator 105B may include semiconductor die 150 with an array of optical emitters disposed thereon. In certain embodiments, the emitters are VCSELs. Any other suitable type of laser diodes or other optical emitters, however, may be used. The emitters may be constructed on die 150 in a certain geometrical layout (e.g., a regular grid or an uncorrelated (quasi-random) layout). Examples of different geometrical layouts are described in U.S. Patent Application Publication No. 2016/0178915 to Mor et al.

In certain embodiments, die 150 is mounted on sub-mount substrate 152 and is electrically connected to substrate 152 using wire bonds 158. External interconnect terminals (e.g., anode contact 154 and cathode contact 156) may be formed on the opposite surface of substrate 152. Projection lens 156 may be mounted on spacers 152, typically such that die 150 lies on the focal plane of the lens. Fan-Out Diffractive Optical Element (FO-DOE) 164 may be mounted above projection lens 166 using thin spacers 168.

Projection lens 166 may collect and collimate the light emitted by the individual VCSELs on die 150. The combination of the VCSELs and the projection lens may generate a pattern of light spots (e.g., grid or quasi-random) according to the geometrical layout of the VCSELs on die 150. In certain embodiments, the pitch or density of the projected pattern (i.e., the angular separation between light spots) is determined by the physical distances between the VCSELs on die 150 and the focal length of projection lens 166. This pattern of light spots may be referred to as a baseline pattern.

DOE 164 may function as a beam splitter, which produces and projects multiple replicas of the baseline pattern onto the object or scene. The multiple replicas may be angularly-offset relative to one another, and overlap one another. The resulting pattern of light spots, which comprises the superposition of the multiple replicas of the baseline pattern, may be referred to as a composite pattern. Due to the overlap between the multiple replicas, the pitch or density of the composite pattern may be higher than that of the baseline pattern. Moreover, the pitch or density of the composite pattern may no longer be limited by the physical distances between VCSELs and by the focal length of the projection lens.

The top of FIG. 3 shows an example of three replicas of the baseline pattern, having an overlap of 50% between them, denoted 172, 174 and 176. As depicted in FIG. 3, the pitch of the composite pattern is two times finer than the pitch of the baseline pattern (the pitch of a single replica). The example of FIG. 3 is highly simplified for the sake of clarity. For example, FIG. 3 shows pattern replication in one dimension. In alternative embodiments, DOE 164 may generate replicas that are angularly-offset and overlap in two dimensions.

Figure 4:
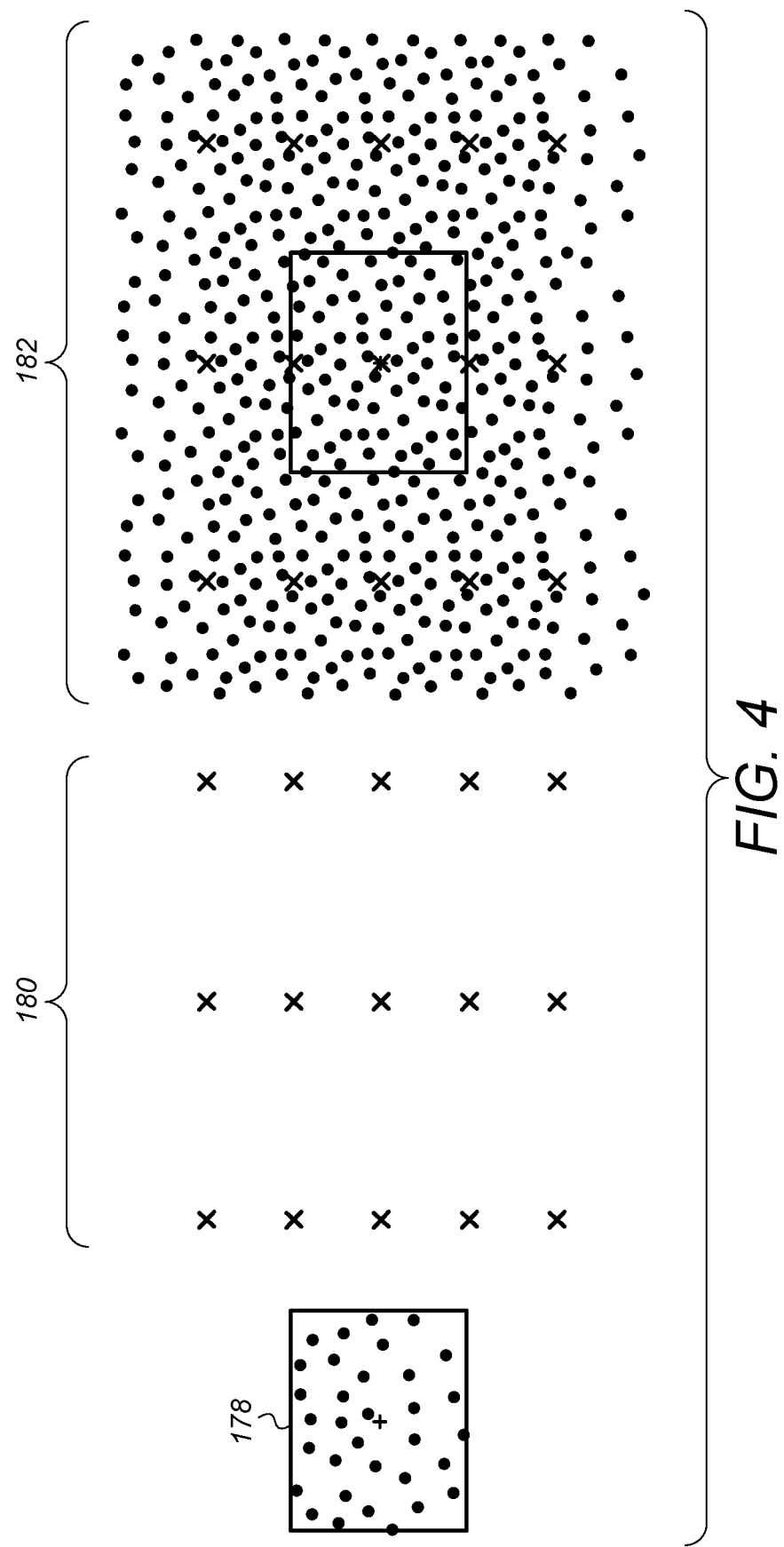
FIG. 4 depicts a diagram of an embodiment of an overlapping pattern configuration.

FIG. 4 depicts a diagram of an embodiment of an overlapping pattern configuration. The left-hand side of FIG. 4 depicts a single replica of the projection pattern, with the light spots shown as circles, the center of the lens marked with a cross, and the period of pattern (in case of replication without overlap) marked by a rectangular frame. This layout also corresponds to the baseline pattern that is subsequently replicated by FO DOE 164. The middle of FIG. 4 shows a replication scheme 180 carried out by FO DOE 164, with the center position of the replica marked with "x". The right-hand side of FIG. 4 shows a corresponding composite pattern 182 that is projected from DOE 164. In pattern 182, the light spots are marked with circles, the center position of each replica is marked with "x", and the lens center is marked with a cross. For ease of comparison, the center of composite pattern 182 in FIG. 4 (corresponding to the zero-order of DOE 164) is marked with a rectangle. As can be seen clearly in FIG. 4, the density of circles in the area of pattern 182 in which the replicas overlap (i.e., the density of the composite pattern) is higher than the density of circles in baseline pattern 178.

In the example of FIG. 4, die 150 (e.g., the VCSEL array) has an uncorrelated, quasi-random layout. The array is designed with the physical minimal distance limitations of the array, but also takes into account that 50% overlap in the y-axis will still reserve minimum distance between the spots. FO DOE 144 performs 3×5 replication (e.g., replicates the baseline pattern three times along one axis (referred to arbitrarily as horizontal according to the orientation of the figure), and five times along the orthogonal axis (referred to as vertical)). On the horizontal axis, the FO period (distance between "x" markers in configuration 160) is identical to the width of baseline pattern 158. On the vertical axis, the FO period is half the dimension of the baseline pattern.

As shown in FIG. 4, ⅔ of projected pattern 182 may include a dense pattern, while on both vertical ends the pattern is sparse since it has no overlap. In this simplified example, the sparse pattern occupies a relatively large portion of the pattern because the example has a small number of replicas. In a real-life projector, the number of replicas may be larger and therefore the portion of the sparse pattern out of the total Field of View (FOV) may be smaller.

In some embodiments, illuminator 105B may provide dynamic control over the density of the spots in the composite pattern. In some embodiments, illuminator 105B may be able to increase and decrease the spot density by dividing the VCSEL array into segments, and activating or deactivating each segment selectively.

Figure 5:
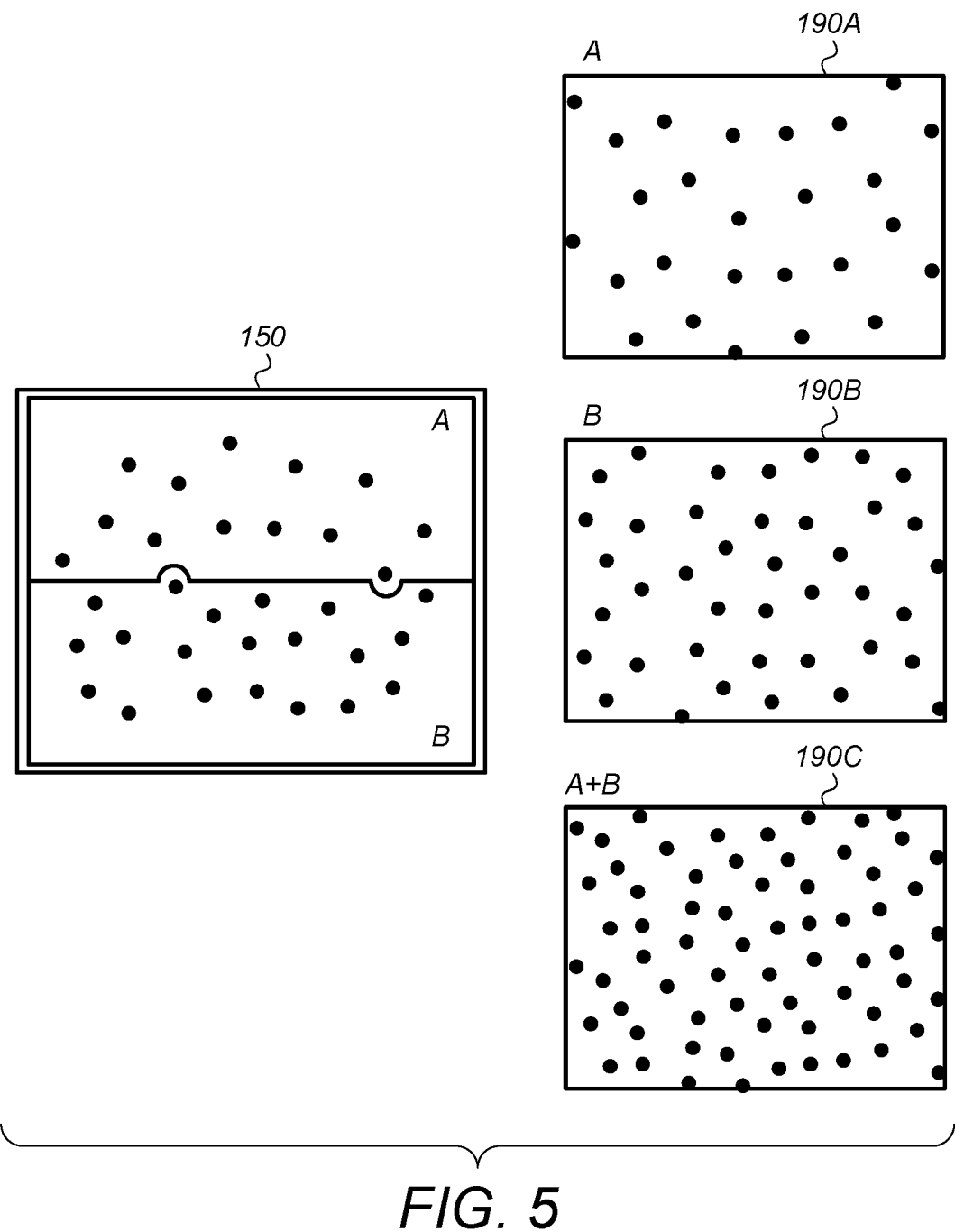
FIG. 5 depicts a diagram of an embodiment illustrating dynamic control of projected pattern density.

FIG. 5 depicts a diagram of an embodiment illustrating dynamic control of projected pattern density. The left-hand side of FIG. 5 shows die 150 (e.g., the VCSEL array) that may generate a quasi-random pattern, such as shown in FIG. 4. In certain embodiments, die 150 is divided into two segments denoted A and B with a selected number of emitters in each segment of the array. The two segments may be isolated from one another by a horizontal groove in the middle of the array. In some implementations, the two segments are electrically isolated but do not include any visible demarcation. In some embodiments, segment A includes about 40% of the emitters in the array and segment B includes about 60% of the emitters in the array.

Illuminator 105B may include control circuitry (not shown in the figure) for driving the VCSELs of each segment separately (e.g., by applying or shutting-off electrical power supply to each segment separately). Thus, the control circuitry may drive only segment A (in which case the VCSELs of segment A emit light and the VCSELs of segment B are dark), drive only segment B (in which case the VCSELs of segment B emit light and the VCSELs of segment A are dark), or drive both segments (i.e., VCSELs of both segments emit light).

The right-hand side of FIG. 5 shows the resulting patterns that are created by replication using a FO DOE, as described for FIG. 4, (only the area of the center pattern is shown). Since the FO DOE period is half the pattern width, it is identical to the width of the pattern that is generated by operating only half of the array. Therefore, the replication matches half of the array (and have no gaps and no overlap between the tile). Three patterns 190A, 190B, 190C are shown, corresponding to the three above-described modes (denoted "A", "B" and "A+B"), respectively. As shown in FIG. 5, the spot density varies from one mode to another. Since the 2-D pattern of each part (A or B) of the VCSEL array (die 150) is configured with a different density (e.g., A=about 40% of emitters in the array, B=about 60% of emitters in the array), the projection patterns shown in 190A, 190B, 190C are sparse (40%), medium (60%) and dense (100%), respectively.

The partitioning of VCSELs into segments shown in FIG. 5 is merely an example partitioning. In some embodiments, the VCSELs may be divided into any suitable number of segments in any desired manner. For example, an array that is designed for 50% overlap in both axes may be divided into four quadrants. Different segments need not necessarily comprise the same number of VCSELs or have similar shapes. In some implementations, there can be more than two segments of VCSELs. For example, die 150 may include 4 segments of VCSELs that can be driven independently (e.g., one segment is on while the others are off, any two segments are on while the remaining segments are off, etc.), all with different patterns and resulting densities. In some implementations, each VCSEL is able to be driven independently and different patterns can be generated by driving the appropriate VCSELs.

In certain embodiments, images captured by camera 102 include images with the user's face (e.g., the user's face is included in the images). An image with the user's face may include any digital image with the user's face shown within the frame of the image. Such an image may include just the user's face or may include the user's face in a smaller part or portion of the image. The user's face may be captured with sufficient resolution in the image to allow image processing of one or more features of the user's face in the image.

Figure 6:
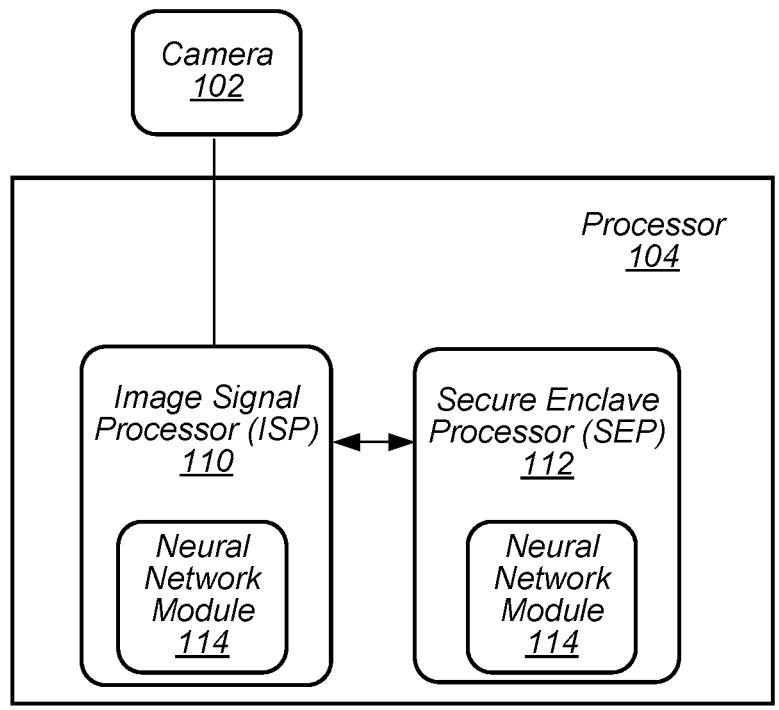
FIG. 6 depicts a representation of an embodiment of a processor on a device.

Images captured by camera 102 may be processed by processor 104. FIG. 6 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture and store images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature data from the images) from the enrollment process are stored in a template in device 100. The template may be stored, for example, in a template space in memory 106 of device 100. In some embodiments, the template space may be updated by the addition and/or subtraction of images from the template. A template update process may be performed by processor 104 to add and/or subtract template images from the template space. For example, the template space may be updated with additional images to adapt to changes in the authorized user's appearance and/or changes in hardware performance over time. Images may be subtracted from the template space to compensate for the addition of images when the template space for storing template images is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR images and depth map images independently of each other before a final authentication decision is made for the user. For example, ISP 110 may process the images independently to determine characteristics of each image separately. SEP 112 may then compare the separate image characteristics with stored template images for each type of image to generate an authentication score (e.g., a matching score or other ranking of matching between the user in the captured image and in the stored template images) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored template images to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Figure 7:
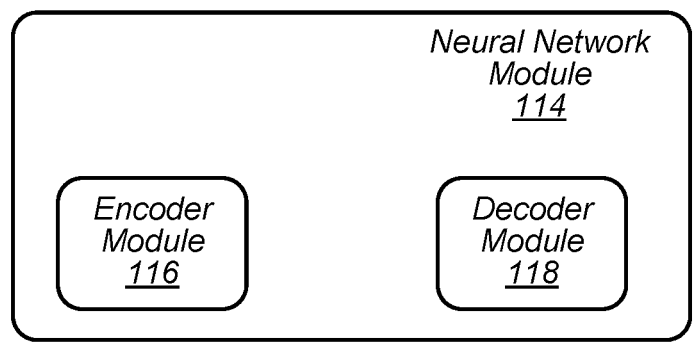
FIG. 7 depicts a representation of an embodiment of a neural network module.

FIG. 7 depicts a representation of an embodiment of neural network module 114. Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

In certain embodiments, neural network module 114 includes encoder module 116 and decoder module 118. Encoder module 116 and decoder module 118 may be machine learning models operated inside neural network module 114 (e.g., the encoder module and the decoder module are executed in neural network module). Encoder module 116 may encode images input into the encoder module and define features in the images as feature vectors in a feature space (as described herein). Decoder module 118 may decode the feature vectors in the feature space generated by encoder module 116 and provide an output (as described herein).

Figure 8:
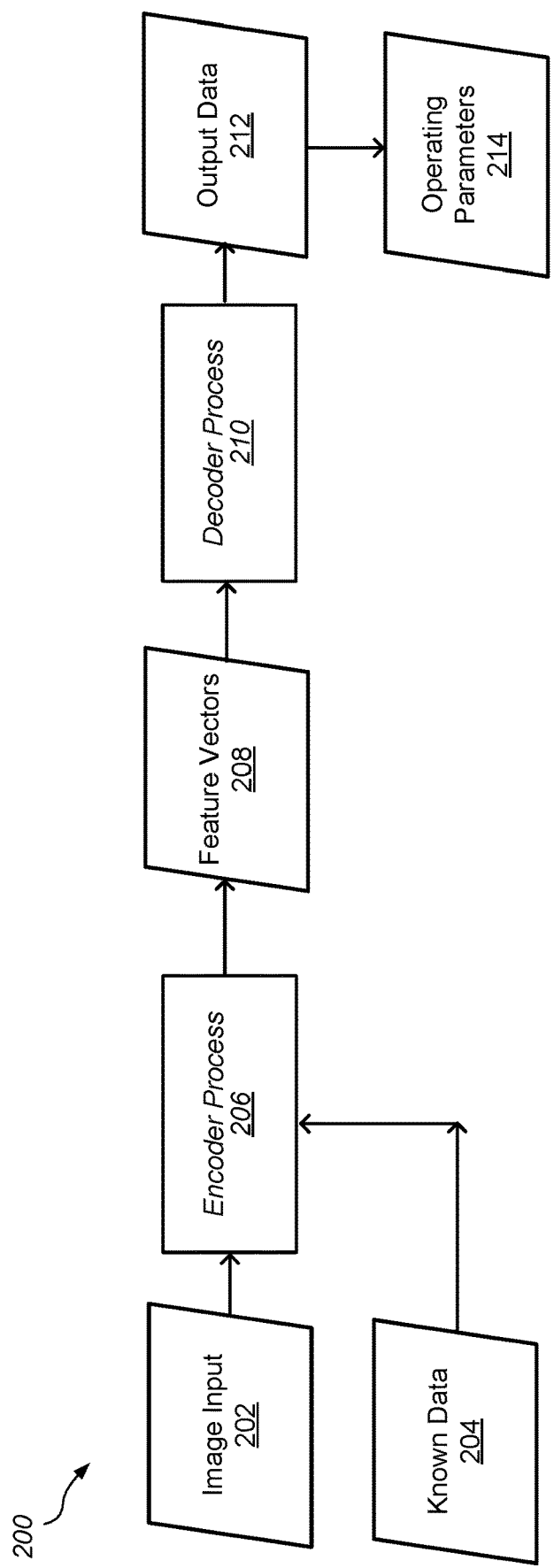
FIG. 8 depicts a flowchart for an embodiment of a training process for a neural network module.
Figure 9:
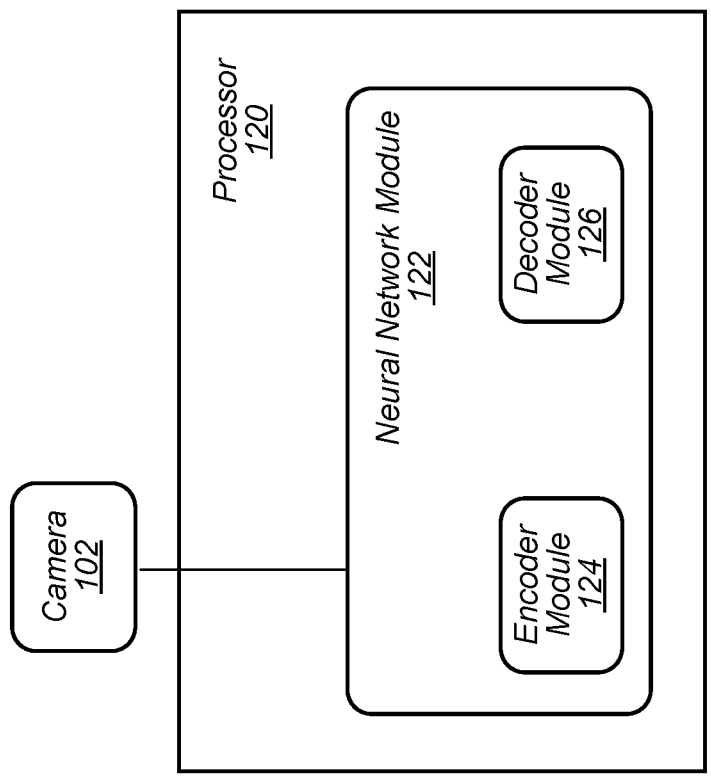
FIG. 9 depicts a representation of an embodiment of a processor with a neural network module.

FIG. 8 depicts a flowchart for an embodiment of training process 200 for a neural network module. In certain embodiments, training process 200 is implemented using a neural network module (e.g., a training neural network module) that is located on a computer processor other than processor 104. FIG. 9 depicts a representation of an embodiment of processor 120 with neural network module 122 that may be used for training (e.g., the training neural network module). Neural network module 122 may include encoder module 124 and decoder module 126. In certain embodiments, images that have been previously captured are provided to neural network module 122 as training images. Known properties of the training images may be provided to neural network module 122 along with the training images (e.g., the training images may be augmented with the known properties). In some embodiments, camera 102 may be coupled to processor 120 and/or neural network module 122. Camera 102 may be used to capture images of the training images and provide the camera-captured images to neural network module 122.

Encoder module 124 and decoder module 126 may be substantially similar or substantially the same as encoder module 116 and decoder module 118, respectively. Encoder module 124 and decoder module 126 may be located in neural network module 122 on processor 120 to be trained by training process 200. Operating parameters output generated from "trained" neural network module 122 may then be used in neural network module 114 on device 100 for implementation of the "trained" neural network module on the device.

In some embodiments, processor 120 is a GPU-enabled computer processor. Training neural network module 122 on the GPU-enabled computer processor may output operating parameters using a floating-point number representation mode. For example, operating parameters generated from "trained" neural network module 122 may include weights or kernels that are described using floating-point numbers. In such embodiments, the floating-point operating parameters may need to be converted to integer number representations before being used on neural network module 114 on device 100. Any conversion process known in the art may be used to convert the operating parameters from the floating-point number representation mode to the integer number representation mode.

In certain embodiments, as shown in FIG. 8, training process 200 begins with providing image input 202. Image input 202 may include training images provided to training process 200 (e.g., training images augmented or annotated (e.g., labelled) with the known information as described above are provided to the training process). In some embodiments, image input 202 includes training images captured with camera 102. Training images may include reference images or other sample images obtained from a database of images. For example, training images may be obtained from ImageNet or another similar image database. In certain embodiments, training process 200 is implemented on flood IR illumination images to train the neural network module for face detection in such images. In some embodiments, training process 200 is implemented on depth map images to train the neural network module for face detection in such images.

Image input 202 may include a plurality of training images with a variety of different users and/or faces in the images. The faces in the images may have varying locations in the images and/or poses in the images. The locations and/or poses of the faces in the training images may be known (e.g., the images have labels or other indicia identifying the known information of the locations and poses). The known information for locations and poses may be provided into training process 200 as known data 204. In some embodiments, the training images are augmented with known data 204.

In some embodiments, the training images are input (e.g., captured by the camera) at varying distances from the camera. The value of distance for each captured image may be known and the known information may be provided into known data 204 along with the known information for locations and poses. Thus, the known information of these properties (locations and/or poses of the face and distance between the face and camera) are included in known data 204.

Image input 202 may be provided to encoder process 206. Encoder process 206 may be performed by, for example, encoder module 124, shown in FIG. 9. In encoder process 206, shown in FIG. 8, the encoder module may encode images input into the encoder process and define features in the images as feature vectors in a feature space. For example, the encoder module may define facial features in a user's face (and other features in the images) as feature vectors in the feature space. Encoder process 206 may output feature vectors 208. Feature vectors 208 (e.g., the output of encoder process 206 (and the encoder module)) includes feature vectors representing the user's facial features (and/or other features in the images) in the feature space. A feature space may be an N-dimensional feature space. A feature vector may be an n-dimensional vector of numerical values that define features in the image for a region in the feature space that corresponds to a region in the image. For example, in some embodiments, the feature vector may be a 1024-dimensional vector. Any number of dimensions may be implemented in various embodiments.

Figure 10:
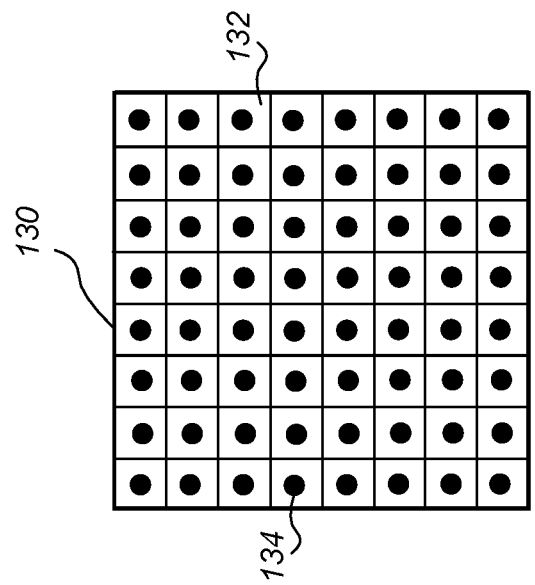
FIG. 10 depicts an example of an embodiment of a feature space with regions.

FIG. 10 depicts an example of an embodiment of feature space 130 with regions 132. Regions 132 in feature space 130 may be, for example, cells in a grid with the grid representing the feature space. In the example of FIG. 10, feature space 130 is an 8×8 grid of regions 132. Feature space 130 may, however, have a different dimension grid as needed. Dots 134 represent feature vectors in each of regions 132. Regions 132 in feature space 130 may correspond to regions or areas in the input images. Thus, in the example of FIG. 10, the input image is divided into 64 regions (8×8 regions) in feature space 130 with each region 132 representing a different region of the input image.

In certain embodiments, the encoder module used in encoder process 206 (e.g., encoder module 124, shown in FIG. 9) is a neural network. For example, the encoder module may be a multi-scale neural network or another neural network where the scale of kernels used in the network can vary. In certain embodiments, the encoder module is a multi-scale convolutional neural network. Using a multi-scale convolutional neural network, encoder process 206 may generate a high-level representation of image input 202 with high-level feature vectors in the feature space. For example, encoder process 206 may generate a 32×32 grid representation with a feature vector in each region (cell) of the grid whereas the input image may have a higher resolution (e.g., image input 202 may be a 256×256 image).

As shown in FIG. 8, feature vectors 208 may be provided into decoder process 210. Decoder process 210 may be performed by, for example, decoder module 126, shown in FIG. 9. In decoder process 210, the decoder module may decode the feature vectors in the feature space of feature vectors 208 generated in encoder process 206. Decoding the feature vectors may include operating on the feature vectors with one or more classifiers or a classification-enabled network to determine (e.g., extract) output data 212 from image input 202. Output data 212 may include, for example, information or properties about faces in image input 202.

In certain embodiments, the decoder module used in decoder process 210 (e.g., decoder module 126) is a neural network. For example, the decoder module may be a recurrent neural network (RNN). In certain embodiments, gated recurrent unit (GRU) recurrent neural network. Other recurrent neural networks may, however, also be used such as a long short-term memory (LSTM) recurrent neural network.

In certain embodiments, decoder process 210 includes decoding feature vectors for each region in the feature space (e.g., each region 132 in feature space 130, shown in the example of FIG. 10). Feature vectors from each of the regions of the feature space may be decoded into non-overlapping boxes in output data 212. In certain embodiments, decoding the feature vector (e.g., extracting information from the feature vector) for a region includes determining (e.g., detecting) if one or more faces are present in the region. In training process 200, the presence of faces in the image input 202 is known and may be correlated with the decoded feature vectors. As decoder process 210 operates on each region in the feature space, the decoder module may provide a face detection score (e.g., a prediction based on a confidence score on whether a face or portion of a face is detected/present in the region) for each region in the feature space. In some embodiments, using the RNN, multiple predictions on whether one or more faces are present may be provided for each region of the feature space with the predictions including predictions about both faces inside the region and faces around the region (e.g., in adjacent regions). These predictions may be collapsed into a final decision of the presence of one or more faces in image input 202. Output data 212 may include the decision on the presence of one or more faces in image input 202.

In certain embodiments, a face is detected in a region without much overlap with adjacent regions as the regions are decoded as non-overlapping boxes. In some embodiments, however, multiple regions decoded in decoder process 210 may detect the same face. If the same face is detected in multiple regions, then confidences for these regions may be ranked. The multiple predictions may be used to determine a confidence that a face, or a portion of a face, is present in each region (e.g., the predictions may be used to rank confidence for the regions). The region(s) with the highest confidence for the detected face may then be selected as the region used in training process 200.

In certain embodiments, when the presence of one or more faces are detected in a region, the predictions generated by decoder process 210 includes assessments (e.g., determinations) of one or more properties of the detected face(s) in the region. The assessed properties may include a position of the face relative to a center of the region (e.g., offset of the face from the center of the region), a pose of the face in the region, and a distance between the face in the region and the camera. Pose of the face may include pitch, yaw, and/or roll of the face. The assessed properties may be included in output data 212 along with the decision on the presence of one or more faces in image input 202.

In training process 200, the values of the properties of the face(s) may be determined by correlating decoded feature vectors with known data 204. For example, known data 204 may provide known properties of the face(s) in image input 202 with the known properties defining the properties assessed by decoder process 210. In certain embodiments, during training process 200, correlating decoded feature vectors with known data 204 includes the decoder module for decoder process 210 assessing differences between decoded feature vectors and known data 204. The detector module may, for example, perform error function analysis (or similar analysis) on the differences between the decoded feature vectors and known data 204 and refine the feature vector decoding process until the feature vector decoding process accurately determines the known data. Thus, as multiple training images are processed in training process 200, decoder process 210 (and encoder process 206) may be trained by the training images in image input 202 and known data 204 to accurately detect the present of face(s) and assess values of properties of the face(s).

In certain embodiments, outputs for pose of the face and/or distance between the face and the camera are discretized (e.g., provided as discrete outputs). For example, pitch, yaw, and roll values may be decoded as floating-point values. In some embodiments, the floating-point values may be positive or negative floating-point values. Instead of performing a regression on the floating-point values, the floating-point outputs may be discretized by choosing a minimum and maximum range and then dividing the floating-point outputs into K bins, where K is a positive integer. Using the bins, if the output falls into a bin, it gets assigned a 1, if the output does not fall into a bin, it gets assigned a 0. If the floating-point value is not in the range represented by the bins, it may first be clipped to the closest value in the range. Thus, the floating-point outputs may be transformed from a floating-point value to a discrete vector of 0s and 1s (e.g., a feature vector is a discrete vector of 0s and 1s). The network (e.g., the encoder module) may then be trained to predict the K-dimensional vectors instead of a single floating-point value. At runtime (e.g., during operation on a device), a single floating-point value may be recovered from these K-dimensional outputs by treating the network's activation for each bin as a weight. Then taking the weighted-sum of the center values of each bin may yield a single floating-point value.

As example, the minimum and maximum range may be 0 to 10, and there are ten bins. Then, if a floating-point training target is between 0 and 1, it is assigned to the first bin, if it is between 1 and 2, it is assigned to the second bin, and so forth. Values below 0 are assigned to the first bin, and values above 10 are assigned to the last bin. With this procedure, a training value of 2.4 would be transformed into the vector (0 0 1 0 0 0 0 0 0 0), a training value of −1.3 would be transformed into the vector (1 0 0 0 0 0 0 0 0 0), and a training value of 11.9 would be transformed into the vector (0 0 0 0 0 0 0 0 0 1). At runtime, if the network output vector is (0 0 1 1 0 0 0 0 0 0), then the weighted sum procedure would result in the value 3.0.

In some embodiments, during training, the K-dimensional vector may be based on "soft" assignments using any suitable algorithm or formula. For example, given an initial bin assignment as above, the neighboring bins may also be given a value related to the difference between the target and the bin's center value. As an example, the training value of 2.4 in the above example may be instead transformed into the vector (0.67 1.54 0 0 0 0 0 0) based on a simple exponential formula.

Transforming the floating-point values to the discrete vector allows decoder process 210 (and the decoder module) to operate on values for pose of the face and/or distance between the face and the camera by classifying which bin the values are in instead of using a regression solution that is needed for floating-point values. After classifying, decoder process 210 may include mapping of a weighted sum of what floating-point value the center of a bin represents (e.g., weighted average of hump for the bin). The classifying and mapping of the discrete vector and the bins may provide output of pose and/or location assessments that are relatively accurate.

Using classification on discrete vectors instead of regression on floating-point values may allow decoder process 210 to more readily learn (e.g., be trained in training process 200) as neural networks are typically better at doing classifications than regressions. Additionally, error function signals for regressions may be relatively large as error function signals in regressions are bigger the farther the difference is whereas error function signals for discrete vectors and bins are substantially the same no matter how big a difference in error. Thus, using discrete vectors and bins in decoder process 210 to assess pose and/or location may be more efficient for the decoder process learning than using floating-point values.

As described, training process 200 may include training encoder process 206 and decoder process 210 (and their corresponding encoder and decoder modules) on a plurality of training images with a variety of different users and/or faces in the images along with varying properties of the faces in the images. After training process 200 is completed on a set of training images, operating parameters 214 may be generated by the training process based on the correlation between the decoded features vectors and known data 204. Operating parameters 214 include parameters useable in neural network module 122 (e.g., encoder module 124 and decoder module 126), shown in FIG. 9, to detect face(s) input into the neural network module from camera 102 and assess values of properties of the face(s) (e.g., a position of the face, a pose of the face, and a distance between the face and the camera). In some embodiments, operating parameters 214 include classifying parameters used in decoder module 126. Classifying parameters may include parameters used to classify the decoded feature vectors that have been correlated with known data 204 during training process 200. Decoder module 126 may then be able to classify feature vectors for a captured image generated by encoder module 124 using the classifying parameters. Decoding the feature vectors for the captured image by classifying the feature vectors (using the classifying parameters) may allow neural network module 122 to assess the presence of face(s) and the values of properties of the face(s) in the captured image.

Figure 11:
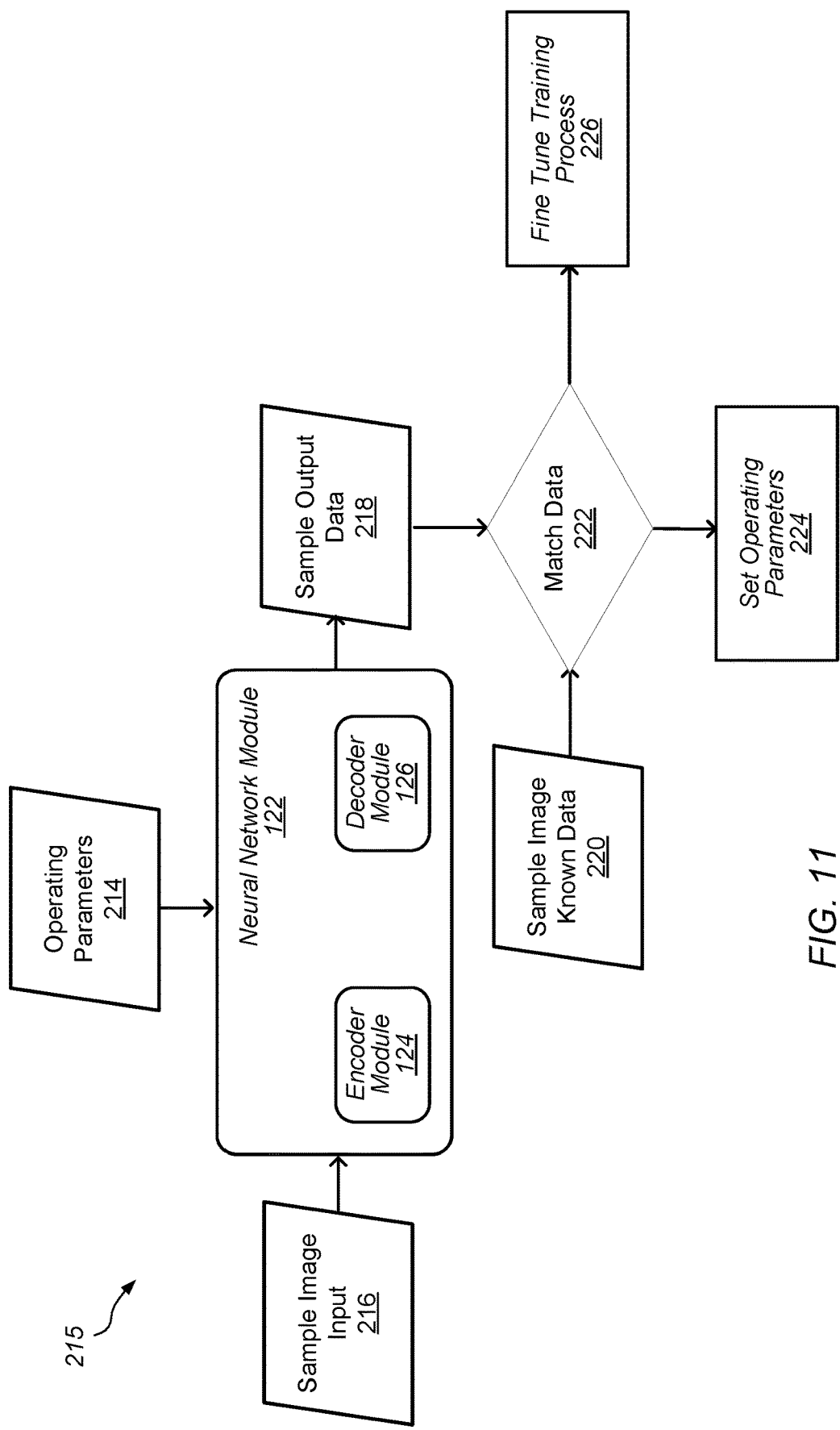
FIG. 11 depicts a flowchart for an embodiment of a test process for a neural network module.

In some embodiments, operating parameters 214 may be tested by inputting the operating parameters into neural network module 122 and operating the module on a sample image with known information (e.g., known face location, known pose, and known distance). FIG. 11 depicts a flowchart for an embodiment of a test process for neural network module 122. In test process 215, sample image input 216 may be provided to neural network module 122 along with operating parameters 214. Neural network module 122 may provide sample output data 218 by processing sample input image 216 using operating parameters 214. Sample output data 218 may be compared to sample image known data 220 to see if the data matches in match data 222.

If sample output data 218 matches sample image known data 220, then the operating parameters are set in 224 (e.g., operating parameters 214 may be set and used to program neural network module 114 on processor 104, shown in FIG. 6, for use in a facial detection process described herein). If sample output data 218 does not match sample image known data 220 (within desired tolerances), then the training process (e.g., training process 200, shown in FIG. 8) may be fine-tuned in 226. Fine-tuning the training process may include providing additional training images to training process 200 and/or other adjustments in the training process to refine the operating parameters (or generate new operating parameters) for neural network module 122.

Once operating parameters 214 for neural network module 122 are set in 224, the operating parameters may be applied to device 100, shown in FIG. 1, by providing the operating parameters to neural network module 114 on the device. In certain embodiments, operating parameters 214 for neural network module 122 are in a number representation mode that is different from the number representation mode that neural network module 114 uses to operate. For example, neural network module 122 may use floating-point numbers while neural network module 114 uses integer numbers. Thus, in such embodiments, operating parameters 214 for neural network module 122 are converted from the floating-point operating parameters to integer operating parameters for use in neural network module 114.

Figure 12:
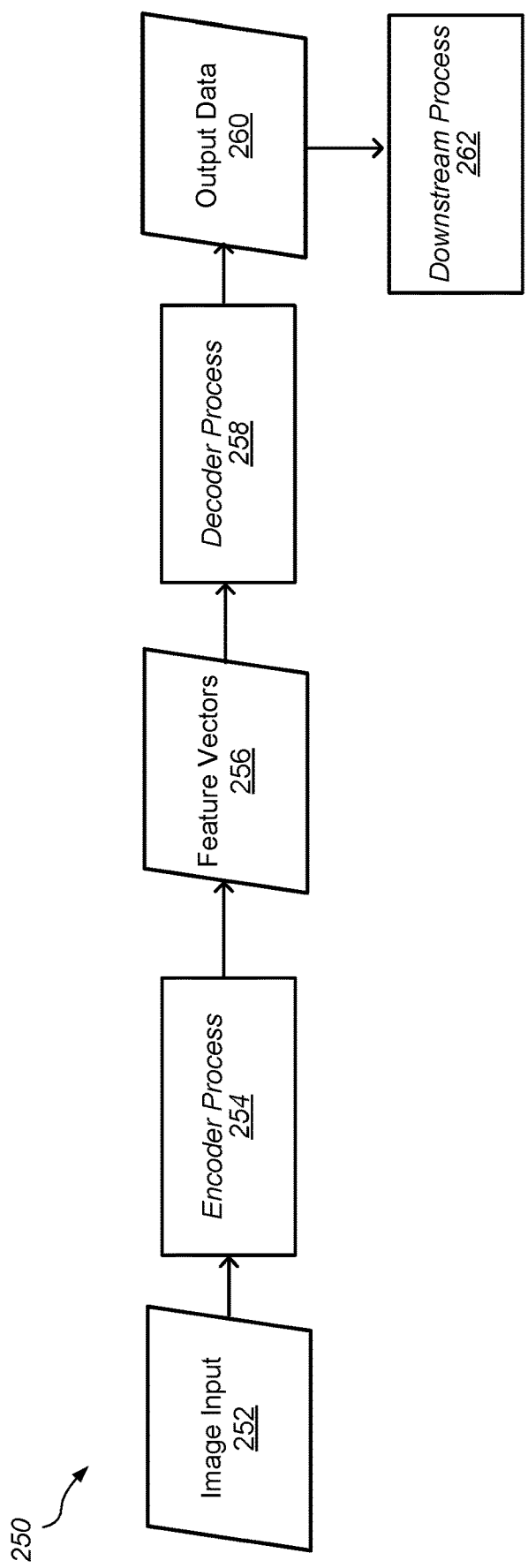
FIG. 12 depicts a flowchart for an embodiment of a face detection process implemented using a neural network module on a device.

After operating parameters are provided to neural network module 114, the neural network module may operate on device 100 to implement a face detection process on the device. FIG. 12 depicts a flowchart for an embodiment of face detection process 250 implemented using neural network module 114 on device 100. Image input 252 may include an image captured using camera 102 on device 100. The captured image may be a flood IR illumination image or a depth map image. Face detection process 250 may be used to detect if there are one or more faces in the image (e.g., place a bounding box around the face(s)) and, if one or more faces are detected, assess values of properties of the face(s) (e.g., location, pose, and/or distance).

The captured image from image input 252 may be provided to encoder process 254. Encoder process 254 may be performed by encoder module 116, shown in FIG. 7. In certain embodiments, encoder module 116 is a multi-scale convolutional neural network (e.g., encoder module 116 is substantially the same neural network as encoder module 124). In encoder process 254, encoder module 116 may encode image input 252 to represent features in the image as feature vectors in a feature space (e.g., a feature space substantially similar to feature space 130, shown in FIG. 10). Encoder process 254 may output feature vectors 256. Feature vectors 256 may be, for example, encoded image features represented as vectors.

Feature vectors 256 may be provided into decoder process 258. Decoder process 258 may be performed by decoder module 118, shown in FIG. 7. In certain embodiments, decoder module 118 is a recurrent neural network (e.g., decoder module 118 is substantially the same neural network as decoder module 126). In decoder process 258, the decoder module may decode feature vectors 256 to assess one or more properties of image input 252 to determine (e.g., extract) output data 260 from the image input. Decoding the feature vectors may include classifying the feature vectors using classifying parameters determined during training process 200. Classifying the feature vectors may include operating on the feature vectors with one or more classifiers or a classification-enabled network.

In certain embodiments, decoder process 258 includes decoding feature vectors for each region in the feature space. Feature vectors from each of the regions of the feature space may be decoded into non-overlapping boxes in output data 260. In certain embodiments, decoding the feature vector (e.g., extracting information from the feature vector) for a region includes determining (e.g., detecting) if one or more faces are present in the region. As decoder process 258 operates on each region in the feature space, the decoder module may provide a face detection score (e.g., a prediction based on a confidence score on whether a face or portion of a face is detected/present in the region) for each region in the feature space. In some embodiments, using the RNN, multiple predictions on whether one or more faces (or portions of faces) are present may be provided for each region of the feature space with the predictions including predictions about both faces inside the region and faces around the region (e.g., in adjacent regions). These predictions may be collapsed into a final decision of the presence of one or more faces in image input 252. Output data 260 may include the decision on the presence of one or more faces in image input 252 (e.g., in the captured image).

In some embodiments, multiple regions decoded in decoder process 258 may detect the same face. Confidence rankings of regions may also be determined by decoder process 258. If the same face is detected in multiple regions, then the ranking of confidences for these regions may be used to determine the region with the highest confidence for the detected face. The region with the highest confidence may then be selected to provide output data 260 (including additional data for values of properties of the detected face).

When the presence of one or more faces are detected in a region of the feature space, the predictions generated by decoder process 258 includes assessments (e.g., determinations) of one or more values of properties of the detected face(s) in the region. Assessing values of properties of the detected face(s) may include classifying the feature vectors, during decoding of the feature vectors, using classifying parameters (obtained from training process 200) that are associated with the properties being assessed. In certain embodiments, the assessed values of the properties include a position of the face relative to a center of the region (e.g., offset of face from the center of the region), a pose of the face in the region, and a distance between the face in the region and the camera. In certain embodiments, the pose of the face includes pitch, yaw, and/or roll of the face. Assessed values of the properties may be included in output data 260 along with the decision on the presence of one or more faces in image input 252.

In certain embodiments, output data 260 is provided to downstream process 262. Downstream process 262 may include any process downstream of face detection process 250 on device 100 that is capable of using the face detection process output. Examples of downstream process 262 include, but are not limited to, additional image signal processing and security enclave processing such as facial recognition processing. In some embodiments, one or more values in output data 260 (are used to control one or more operations of device 100. In some embodiments, the distance values in output data 260 may be used to control operation of speckle pattern illumination output from camera 102 on device 100. For example, the distance values in output data 260 may be used to determine a density (or a density setting) for speckle pattern illumination output from camera 102, as described herein.

As shown in FIG. 12, face detection process 250 may be used to detect one or more faces in an image captured by camera 102 on device 100. Output data 260 may include a decision on one or more faces being in the captured image along with data for values of properties of the detected face(s) (e.g., location, pose, and/or distance from the camera). Face detection process 250 utilizes a single network module (e.g., neural network module 114) to provide face detection output along with location, pose, and distance from the camera of the detected face(s). Using neural network module 114 allows face detection process 250 to be implemented with reduced computational complexity as the computations for face detection and estimation of location, pose, and distance are shared across these tasks. Sharing the tasks may also provide better runtime performance.

In certain embodiments, face detection process 250 is used on an image captured using flood infrared illumination to illuminate a face of a user. For example, face detection process 250 is used on an image captured by camera 102 when the user is illuminated by flood illuminator 105A, shown in FIG. 2. As described above, output data 260 from face detection process 250 may include an assessment (e.g., estimation) of distance between the user's face and camera 102. In certain embodiments, the estimate of distance between the user's face and camera 102 is used to determine a density of illumination provided by speckle illuminator 105B (e.g., a density of speckle pattern infrared illumination illuminating the user).

Figure 13:
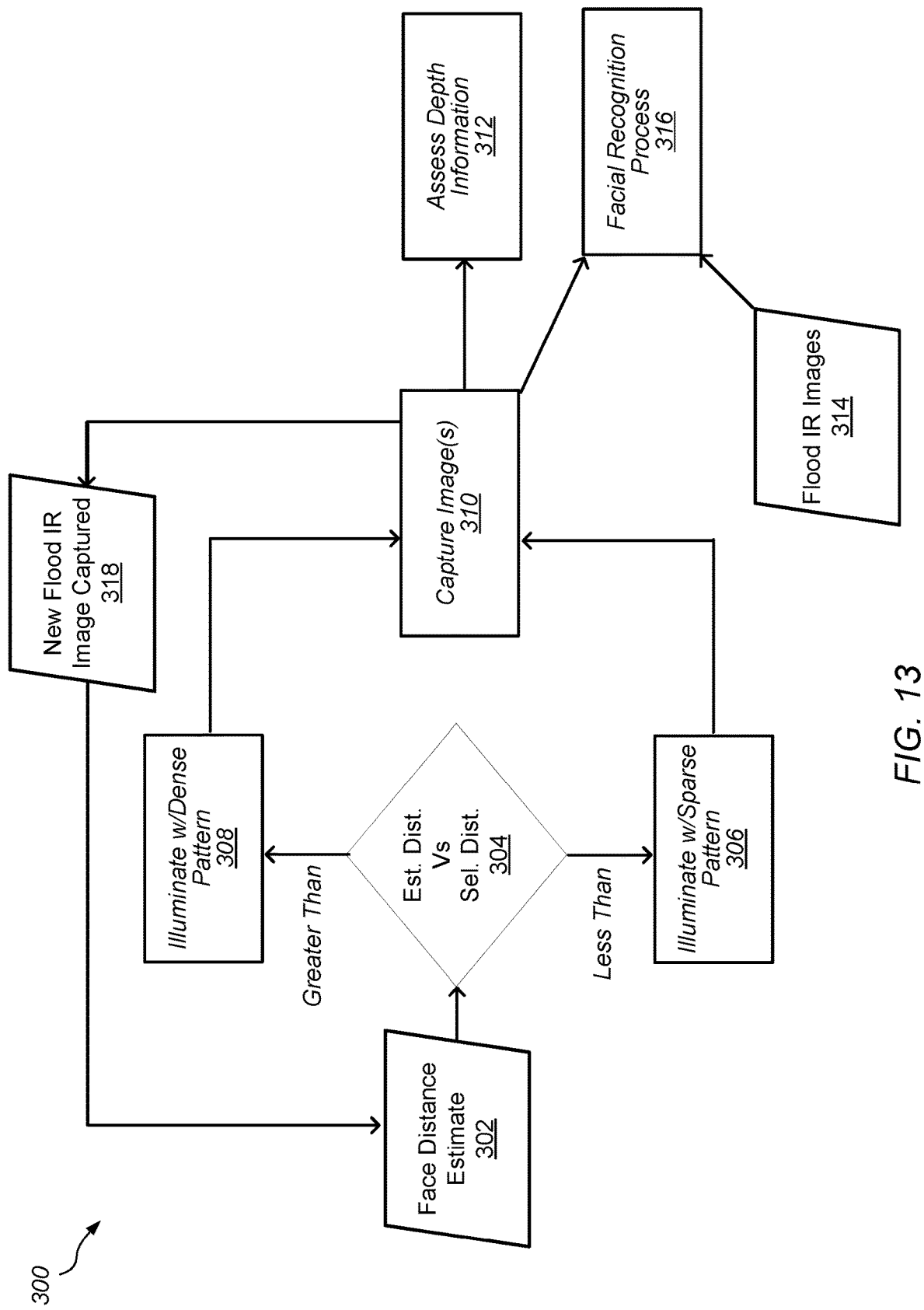
FIG. 13 depicts a flowchart for an embodiment of an illumination determination process.

FIG. 13 depicts a flowchart for an embodiment of illumination determination process 300. Process 300 may be used to determine a density of illumination provided by speckle illuminator 105B on device 100 when an image is capture by camera 102 on the device. Face distance estimate 302 includes an estimate of distance between a user's face and camera 102 on device 100. In certain embodiments, face distance estimate 302 is provided by output data 260 from face detection process 250 using a flood infrared illuminated image capture by camera 102, as described above. In some embodiments, face distance estimate is provided by another sensor on device 100. For example, device 100 may include a proximity sensor, a laser sensor, or another sensor capable of assessing distance information between the device and the user.

In 304, the estimated distance from 302 is compared with a selected or threshold distance. In certain embodiments, the threshold distance is a distance from device 100 at which dots (speckles) in a dense dot pattern (e.g., a higher density dot pattern) no longer overlap. For example, above the threshold distance, the dots (e.g., the speckle pattern) may be in focus. Below the threshold distance, however, dots in the speckle pattern may become bigger and go out of focus. In some cases, below the threshold distance (e.g., if 100% of the emitters are turned for the dense dot pattern), the dots in the speckle pattern may become too big and overlap and the subject becomes flat field illuminated. When flat field illuminated, the individual spots may not be determined from one another (e.g., the location or boundary of each spot is no longer detectable) and three-dimensional measurements may become difficult or impossible. Thus, overlapping between the dots in the speckle pattern may prevent three-dimensional information about the subject from being determined.

To overcome the problems with dots in the speckle pattern becoming too big and overlapping, sparse dot density may be used. As described herein, sparse dot density is provided by using a partial percentage of the emitters in the array of illuminator 105B (e.g., about 40% of the emitters). Using less emitters provides more spacing between the dots in the pattern. Thus, even though the dots are bigger, the larger spacing allows the dots to be differentiated and used for three-dimensional measurements. In certain embodiments, the percentage of emitters used to provide a sparse dot density pattern is a maximum percentage (density) of emitters that, at a threshold distance, still allows differentiation between the dots (e.g., provides a maximum allowable density). For example, in one embodiment, using about 40% of the emitters provides a maximum allowable density at about 20 cm distance between the illuminator and the subject. Thus, in such an embodiment, if more than about 40% of the emitters are used, resolution (e.g., differentiation) between the dots begins to be compromised.

For device 100 (e.g., a mobile device), the threshold distance may be between about 20 cm and about 60 cm. In certain embodiments, the threshold distance is between about 20 cm and about 35 cm. In some embodiments, the threshold distance is between about 10 cm and about 70 cm. In some embodiments, the threshold distance is between about 30 cm and about 50 cm. The threshold distance may vary depending on, for example, the optics of camera 102 and/or the optics of speckle illuminator 105B.

In 304, if the estimated distance from 302 is less than the threshold distance (e.g., 25 cm), then sparse pattern illumination is provided by speckle illuminator 105B in 306 (e.g., only segment A (about 40% of the emitters in the illuminator), shown in FIG. 5, is operated). If the estimated distance from 302 is greater than the threshold distance, then dense pattern illumination is provided by speckle illuminator 105B in 308 (e.g., both segment A and segment B (about 100% of the emitters), shown in FIG. 5, are operated). In certain embodiments, sparse pattern illumination includes speckle pattern illumination with a sparse dot density (e.g., a lower dot density) while dense pattern illumination includes speckle pattern illumination with a dense dot density (e.g., a higher dot density). Thus, dense pattern illumination has a higher dot (speckle) density than sparse pattern illumination.

Once illumination is provided by illuminator 105B using either sparse pattern illumination 306 or dense pattern illumination 308, one or more images may be captured using camera 102 in 310. The image(s) captured in 310 are speckle pattern illumination image(s) (e.g., a depth camera image(s)) of the user. In some embodiments, the speckle pattern image(s) are used to assess depth information for one or more facial features of the user in 312. Depth information may be assessed based on a known configuration and dot pattern being generated by speckle illuminator 105B (e.g., the configuration and density of the sparse pattern illumination or the dense pattern illumination is known). The image(s) captured by camera 102 with speckle pattern illumination may be two-dimensional image(s) with varying spacing between the dots in the image(s) based on the features the illumination is projected on. Depths in the captured image(s) may then be interpolated by assessing spacing of the dots (speckles) in the captured image(s).

In some embodiments, image(s) captured in 310 are provided along with flood infrared illumination image(s) 314 to facial recognition process 316. Flood infrared illumination image(s) 314 may include images used to provide face distance estimate 302. Facial recognition process 316 may include assessing if the user in image(s) captured in 310 and flood infrared illumination image(s) 314 is an authorized user of device 100.

In certain embodiments, after image(s) are capture in 310, a new flood infrared illumination image is captured in 318 and the captured image is provided to face distance estimate 302 to begin process 300 again and provide a new determination for density of illumination (e.g., pattern determination) provided by speckle illuminator 105B. For example, process 300 may be implemented on the new flood infrared illumination image to reassess the distance between the user and camera 102 and determine if the density of the speckle pattern illumination needs to be changed (e.g., switched from sparse pattern to dense pattern or vice versa).

In certain embodiments, camera 102, shown in FIG. 2, alternates between taking flood infrared illumination images and speckle pattern illumination images. For example, camera 102 may take images at 60 fps (frames per second) with 30 frames of flood infrared illumination images being alternated with 30 frames of speckle pattern illumination images in one second. Thus, in some embodiments, reassessment of the pattern determination using the new flood infrared illumination image may occur between capturing successive frames (images) with speckle pattern illumination (e.g., reassessment of the pattern determination every 1/30 sec). The reassessment may, however, take place over a longer time frame. The reassessment of the pattern determination may occur after a batch of speckle pattern illumination images is taken. For example, the reassessment of the pattern determination may occur after a set number of speckle pattern illumination images are taken or after a set amount of time of taking speckle pattern illumination images is completed.

In some embodiments, the reassessment of the pattern determination may be prompted by an action being made on device 100. For example, the pattern determination may be reassessed when camera 102 is triggered to capture new images. The trigger may be when a shutter button for camera 102 is pressed or when an unlock button (or virtual unlock button) for device 100 is pressed.

Estimating the distance between the user's face and camera 102 and using the estimated distance to determine a density of illumination provided by speckle illuminator 105B allows depth images at only one density to be taken for depth information determination. Thus, process 300 may provide depth information more quickly and improve rates for detection of the user (e.g., faster facial detection and/or faster facial recognition). Additionally, taking depth images at only one density may provide power savings for device 100.

In certain embodiments, one or more process steps described herein may be performed by one or more processors (e.g., a computer processor) executing instructions stored on a non-transitory computer-readable medium. For example, process 300, shown in FIG. 13, may have one or more steps performed by one or more processors executing instructions stored as program instructions in a computer readable storage medium (e.g., a non-transitory computer readable storage medium).

Figure 14:
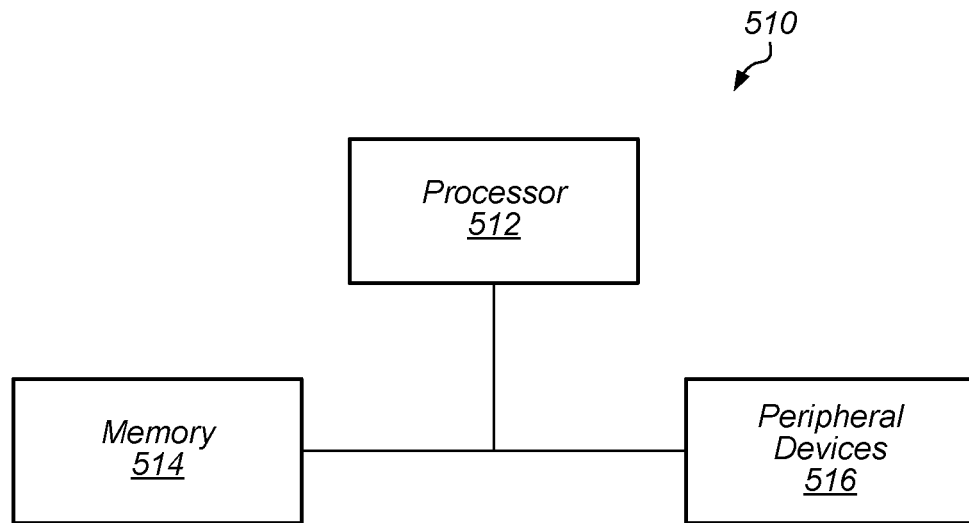
FIG. 14 depicts a block diagram of one embodiment of an exemplary computer system.

FIG. 14 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 300, shown in FIG. 13. In the embodiment of FIG. 14, computer system 510 includes processor 512, memory 514, and various peripheral devices 516. Processor 512 is coupled to memory 514 and peripheral devices 516. Processor 512 is configured to execute instructions, including the instructions for process 300, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Peripheral devices 516 may represent any sort of hardware devices that may be included in computer system 510 or coupled thereto (e.g., storage devices, optionally including computer accessible storage medium 600, shown in FIG.

15, other input/output (I/O) devices such as video hardware, audio hardware, user interface devices, networking hardware, etc.).

Figure 15:
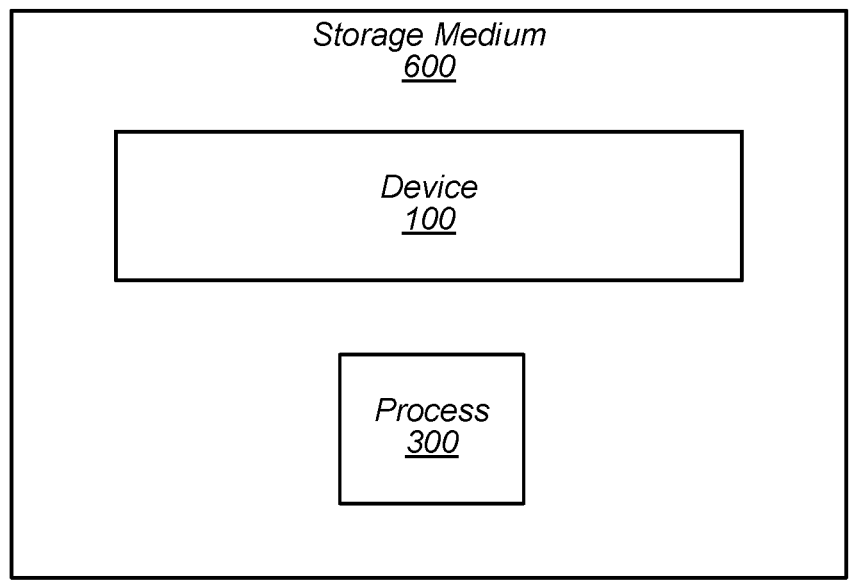
FIG. 15 depicts a block diagram of one embodiment of a computer accessible storage medium.

Turning now to FIG. 15, a block diagram of one embodiment of computer accessible storage medium 600 including one or more data structures representative of device 100 (depicted in FIG. 1) included in an integrated circuit design and one or more code sequences representative of process 300 (shown in FIG. 13). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    capturing a first image using a camera located on a device, the device comprising a computer processor and a memory, wherein the first image comprises an image captured while illuminating with flood infrared illumination from a first illuminator located on the device;
    determining a distance between a user and the camera by assessing two-dimensional information in the first image; and
    illuminating the user with patterned illumination having a first pattern density from a second illuminator located on the device in response to the determined distance being less than a threshold distance, wherein the second illuminator is configured to project one of the first pattern density or a second pattern density, the first pattern density being less than the second pattern density.

2. The method of claim 1, wherein the threshold distance is between about 20 cm and about 60 cm.

3. The method of claim 1, further comprising capturing a second image of the user, the second image comprising an image captured while illuminating the user with the patterned illumination having the first pattern density.

4. The method of claim 3, further comprising authenticating the user as an authorized user of the device using the first image and the second image.

5. The method of claim 1, further comprising illuminating the user with patterned illumination having the second pattern density from the second illuminator in response to the determined distance being greater than the threshold distance.

6. The method of claim 5, further comprising capturing a second image of the user, the second image comprising an image captured while illuminating the user with the patterned illumination having the second pattern density.

7. The method of claim 1, wherein the distance between the user and the camera is a distance between a face of the user and the camera.

8. The method of claim 1, wherein the distance between the user and the camera is determined by assessing two-dimensional information in the first image using machine learning located on the computer processor.

9. The method of claim 1, wherein the distance between the user and the camera is determined by encoding and decoding, using the computer processor, two-dimensional information in the first image.

10. The method of claim 1, further comprising:
    capturing an additional image using the camera, wherein the additional image comprises an image of the user captured while illuminating with flood infrared illumination from the first illuminator;
    determining a second distance between the user and the camera by assessing two-dimensional information in the additional image;
    illuminating the user with patterned illumination having the first pattern density from the second illuminator in response to the second distance being less than the threshold distance; and
    illuminating the user with patterned illumination having the second pattern density from the second illuminator in response to the second distance being greater than the threshold distance.

11. A device, comprising:
    a camera;
    a first illuminator providing flood infrared illumination;
    a second illuminator providing patterned illumination;
    circuitry coupled to the camera, the first illuminator, and the second illuminator, wherein the circuitry is programmed to:
        capture a first image using the camera while illuminating with flood infrared illumination from the first illuminator;
        determine a distance between a user and the camera by assessing two-dimensional information in the first image; and
        illuminate the user with patterned illumination having a first pattern density from the second illuminator in response to the determined distance being less than a threshold distance, wherein the second illuminator is configured to project one of the first pattern density or a second pattern density, the first pattern density being less than the second pattern density.

12. The device of claim 11, wherein the threshold distance is between about 20 cm and about 60 cm.

13. The device of claim 11, wherein the camera comprises an infrared sensor.

14. The device of claim 11, wherein the circuitry is programmed to capture a second image of the user while illuminating the user with the patterned illumination.

15. The device of claim 14, wherein the circuitry is programmed to authenticate the user as an authorized user of the device using the first image and the second image.

16. The device of claim 11, wherein the circuitry is programmed to:
illuminate the user with patterned illumination having the second pattern density from the second illuminator in response to the determined distance being greater than the threshold distance; and
capture a second image of the user while illuminating the user with the patterned illumination having the second pattern density.

17. The device of claim 11, wherein the circuitry is programmed to operate machine learning to determine the distance between the user and the camera.

18. The device of claim 11, wherein the second illuminator comprises an array of emitters, the array of emitters comprising a first set of emitters and a second set of emitters that are controlled separately.

19. The device of claim 18, wherein circuitry is programmed to provide the patterned illumination having the first pattern density by driving the first set of emitters on the second illuminator, and wherein circuitry is programmed to provide the patterned illumination having the second pattern density by driving both the first set of emitters and the second set of emitters on the second illuminator.

20. The device of claim 19, wherein the first set of emitters comprises about 40% of a total number of emitters in the array of emitters.

* * * * *